US006453061B1

(12) United States Patent
Neri et al.

(10) Patent No.: US 6,453,061 B1
(45) Date of Patent: Sep. 17, 2002

(54) METHOD OF CONTROLLING BANKNOTES

(75) Inventors: Armando Neri, Bologna; Stefano Chini, San Lazzaro Di Savena, both of (IT)

(73) Assignee: Currency Systems International, Inc., Irving, TX (US)

( * ) Notice: Subject to any disclaimer, the term of this patent is extended or adjusted under 35 U.S.C. 154(b) by 0 days.

(21) Appl. No.: 09/577,473

(22) Filed: May 24, 2000

(30) Foreign Application Priority Data

May 27, 1999 (IT) ....................................... BO99A0293

(51) Int. Cl.[7] ................................................ G06K 9/00
(52) U.S. Cl. .......................... 382/135; 209/534; 356/71
(58) Field of Search ......................... 382/135; 209/534; 235/379; 250/200; 356/71; 902/7

(56) References Cited

U.S. PATENT DOCUMENTS

| | | | | | |
|---|---|---|---|---|---|
| 4,131,879 | A | | 12/1978 | Ehrat | 382/135 |
| 4,143,279 | A | * | 3/1979 | Ehrat et al. | 250/556 |
| 4,677,680 | A | | 6/1987 | Harima et al. | 382/112 |
| 4,879,000 | A | | 11/1989 | Gausa | 162/198 |
| 5,020,110 | A | * | 5/1991 | Chominski | 382/100 |
| 5,317,390 | A | | 5/1994 | Bolza-Schunemann et al. | 356/394 |
| 5,578,813 | A | * | 11/1996 | Allen et al. | 250/208 |
| 5,992,600 | A | * | 11/1999 | Baudat | 194/204 |
| 5,995,638 | A | * | 11/1999 | Amidror et al. | 382/100 |
| 6,053,406 | A | * | 4/2000 | Litman | 235/449 |

FOREIGN PATENT DOCUMENTS

| | | | | |
|---|---|---|---|---|
| EP | 0723243 A2 | * | 1/1996 | G06K/17/00 |
| EP | 0825023 | | 2/1998 | B41F/33/00 |
| EP | 08767842 A1 | * | 3/1998 | G07D/7/00 |

OTHER PUBLICATIONS

Derwent English Abstract of EP 0825023 Dated Feb. 25, 1998.

* cited by examiner

*Primary Examiner*—Leo Boudreau
*Assistant Examiner*—Barry Choobin
(74) *Attorney, Agent, or Firm*—Colin P. Cahoon; Carstens, Yee & Cahoon, L.L.P.

(57) ABSTRACT

A method of controlling banknotes provides for acquiring a first image of a banknote having two successive prints; determining a relative deviation of the prints; determining deformation of the banknote; forming a second image as a function of the relative deviation, of the deformation, and of a third and fourth image characteristic of the respective successive prints; and emitting an error signal when the luminance values of the first image are outside first ranges relating to luminance values of the second image, or when the relative deviation is outside a second range.

6 Claims, 4 Drawing Sheets

METHOD OF CONTROLLING BANKNOTES

FIELD OF THE INVENTION

The present invention relates to a method of controlling banknotes.

BACKGROUND OF THE INVENTION

As is known, banknotes are made from a sheet of such a size as to contain several finished banknotes, and which comprises watermarked regions and/or metal bands, and is fed along a given path along which it undergoes various printing steps, each involving a different printing technique.

The most common printing steps are offset printing, by which images normally representing a coloured background are printed; intaglio or copperplate printing, for printing faces of famous people and numbers representing the value of the banknote; and printing of the serial numbers. Offset printing is performed on both faces of the sheet with no alignment with the edge of the sheet, which therefore cannot be used as a reference by which to acquire the coordinates of offset printed details.

Intaglio printing is performed at high pressure using a plate, and deforms the paper so that the plate is inclined, and the intaglio print itself possibly misaligned, with respect to the offset print. Intaglio printing is performed on one or both faces of the sheet, and may comprise a number of successive prints, each of which may be misaligned with respect to the offset or other intaglio prints. Any deviation of the various successive prints comprises translation along an X axis, translation along a Y axis perpendicular to the X axis, and rotation, all of which are also caused, as stated, by deformation of the sheet in the course of printing steps at different pressures.

Once offset and intaglio printed, the sheet is quality controlled to determine acceptable deviations of the successive prints, and to assign each banknote a pass signal. The serial numbers are then printed on the respective passed banknotes, and the sheet is cut into individual banknotes.

Quality control is frequently performed manually by a checker, and consists in visual inspection to ensure the offset and intaglio prints do not deviate too far from an ideal value, and that there are no colouring errors, i.e. over- or underinked regions, or blurring.

Alternatively, quality control may now also be performed automatically using a television camera, which assigns each pixel a luminance value characteristic of a given surface of the banknote corresponding with the pixel, and compares each luminance value with a respective acceptance range. Automatic control is complicated by numerous factors, foremost of which is determining acceptance ranges enabling accurate control of both colouring and relative deviations, which in turn is complicated by the luminance of each pixel depending on various factors, such as the printed region partly occupying the surface corresponding to the pixel, and the type of ink and paper used.

Determining the acceptance ranges is further complicated by relative deviations of up to a millimeter in the various prints being considered acceptable, and by effective colour control requiring the use of television cameras of such definition that each pixel corresponds to a banknote portion of 0.125×0.125 square millimeters. In relation to the size of the surface assigned to each pixel, an acceptable deviation of one millimeter therefore means the luminance value of each pixel may vary within a very wide range. That is, the surface corresponding to each pixel may be either fully inked or have no ink at all, particularly when the surface portion in question is located at the edge of a figure or number, thus calling for a wide acceptance range. On the other hand, however, a wide acceptance range would fail to provide for effective control by possibly passing banknotes which should be rejected.

SUMMARY OF THE INVENTION

It is an object of the present invention to provide a method of controlling banknotes, designed to eliminate the aforementioned drawbacks.

According to the present invention, there is provided a method of controlling banknotes comprising a first print and a second print, said first and second prints being effected at different stages; the method comprising the steps of acquiring a first image of the banknote; comparing said first image with a second image; calculating a relative deviation between the first print and the second print of said banknote; and emitting an error signal in the event the luminance values of the first image fail to fall within respective first acceptance ranges of the luminance values of the second image, or said relative deviation fails to fall within a second acceptance range; said method being characterized by comprising the further steps of calculating deformation of the banknote; and forming said second image as a function of the relative deviation, of the deformation, of a reference third image of the first print, and of a reference fourth image of the second print.

The method according to the present invention is particularly advantageous by enabling colour control of the banknotes with none of the errors caused by relative deviation of the first and second prints and by deformation of the banknote.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
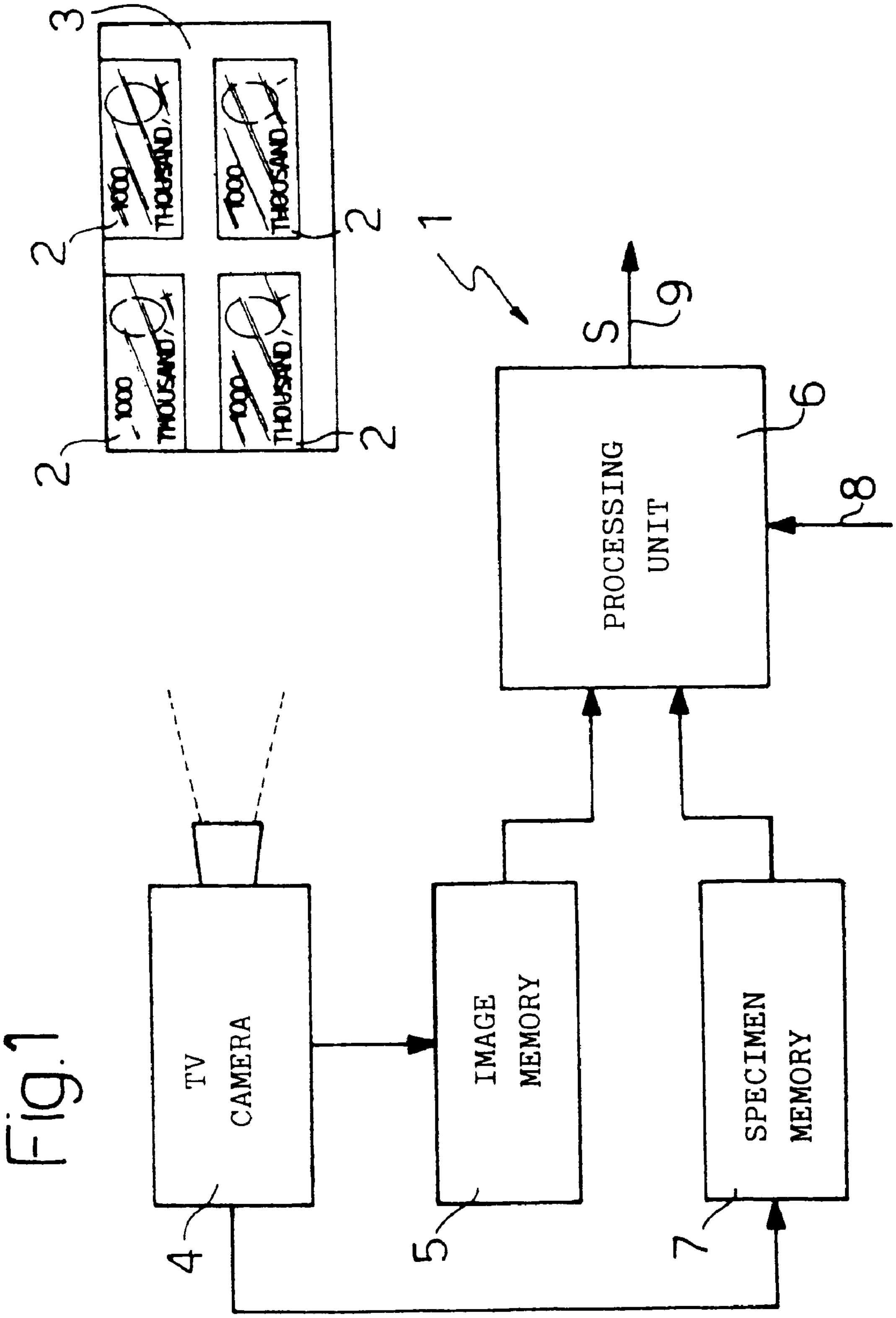
FIG. 1 shows a schematic view, with parts removed for clarity, of a device implementing the method according to the invention.

Number 1 in FIG. 1 indicates a device for controlling banknotes 2 printed on a sheet 3. Control device 1 comprises a television camera 4 for picking up one banknote 2 at a time and generating a discrete, digitized grey-tone television signal which is transmitted to an image memory 5. Image memory 5 stores the images of banknotes 2 in the form of a matrix of dots or so-called pixels P, each of which is assigned a value Vb related to the grey level, i.e. the luminance reflected by a surface corresponding to pixel P. Each pixel P corresponds to a 0.125 mm square of banknote 2, and value Vb represents a mean value of the luminance of the square.

Image memory 5 is connected to a processing unit 6, which comprises an image processing section, i.e. an image processor, and a logic section, and which provides for processing and comparing the image of banknote 2 with a given specimen banknote BC. For which purpose, processing unit 6 is connected to a specimen memory 7 structured according to the method of generating one or more specimen banknotes BC, as described later on. Processing unit 6 also comprises an input 8 by which processing unit 6 receives external data and commands, and an output 9 by which processing unit 6 supplies a signal S indicating acceptance or rejection of the controlled banknote 2.

Banknote 2 is produced using a known method comprising the steps of advancing sheet 3, which is sized to contain a number of banknotes 2; printing, in one printing step, the graphic portion of the image representing the background of each banknote 2, and which is commonly referred to as the offset print O; printing, in one printing step, the dark image and the numbers indicating the value of each banknote 2, and which is commonly referred to as the intaglio or copperplate print I; controlling the quality of the printing; printing serial numbers on respective accepted banknotes 2; and cutting banknotes 2 from sheet 3.

Besides acquiring the images of the fully printed banknotes 2, i.e. comprising offset print O and intaglio print I, device 1, before commencing control, acquires a reference image 10 of offset print O without intaglio print I (FIG. 2), and a reference image 11 of intaglio print I without offset print O (FIG. 3), and stores in specimen memory 7 the characteristic luminance values VOp and VIp of all the pixels P of respective images 10 and 11.

Figure 3:
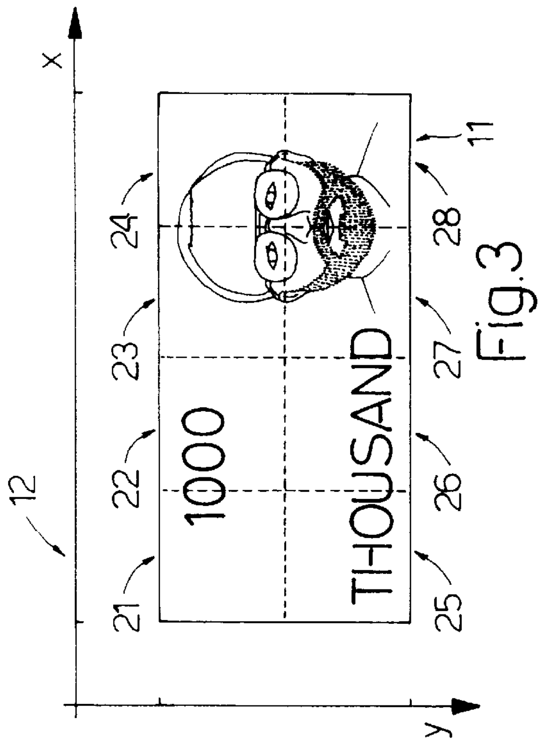
FIGS. 2 to 4 show images used to implement the method according to the invention.
Figure 2:
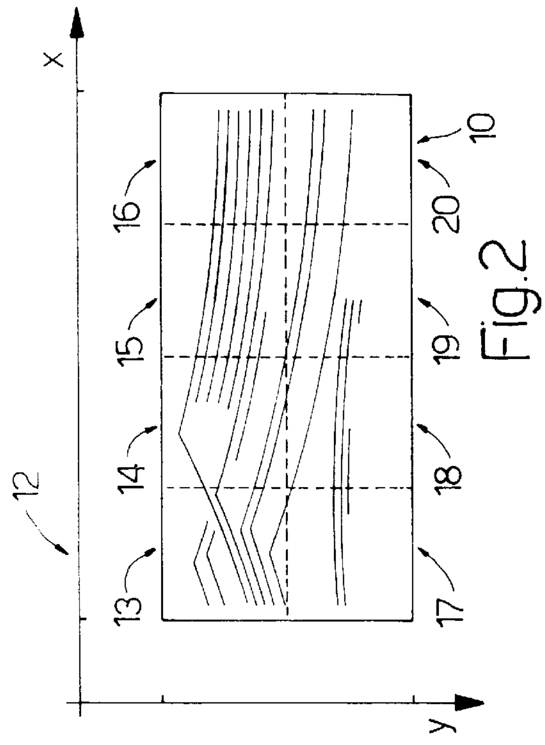

As shown in FIG. 2, image 10 is referenced to a cartesian reference system 12 comprising an X axis and a Y axis, and is divided into eight regions 13, 14, 15, 16, 17, 18, 19, 20. As shown in FIG. 3, image 11 is also referenced to Cartesian reference system 12, and is divided into eight regions 21, 22, 23, 24, 25, 26, 27, 28, which substantially correspond to respective regions 13, 14, 15, 16, 17, 18, 19, 20 of image 10.

Figure 4:
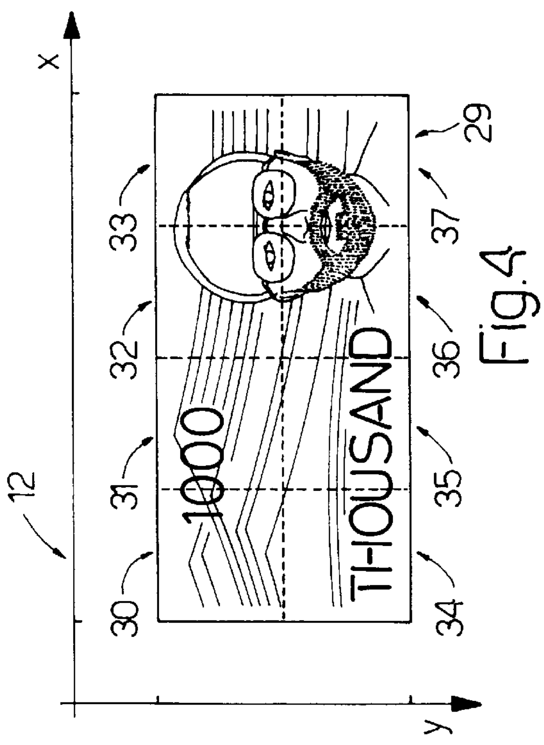

Number 29 in FIG. 4 indicates an image of banknote 2 referenced to cartesian reference system 12 and divided into eight regions 30, 31, 32, 33, 34, 35, 36, 37, which substantially correspond to respective regions 13, 14, 15, 16, 17, 18, 19, 20 of image 10, and to respective regions 21, 22, 23, 24, 25, 26, 27, 28 of image 11.

Figure 5:
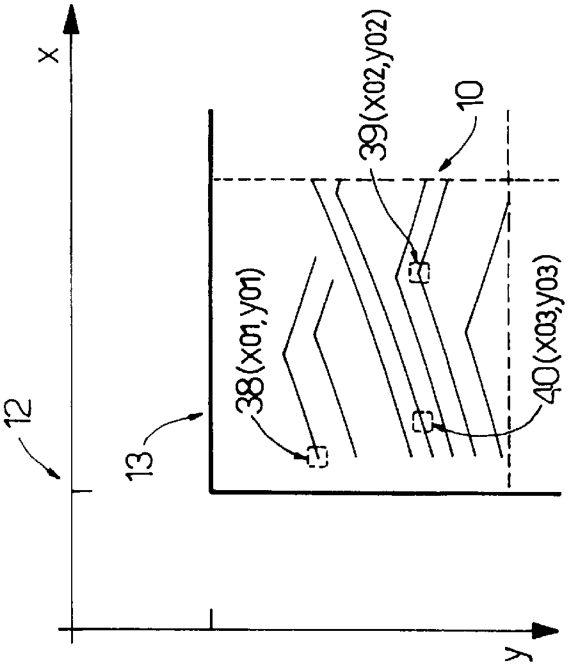
FIGS. 5 to 7 show larger-scale views of portions of respective FIGS. 2 to 4.
Figure 7:
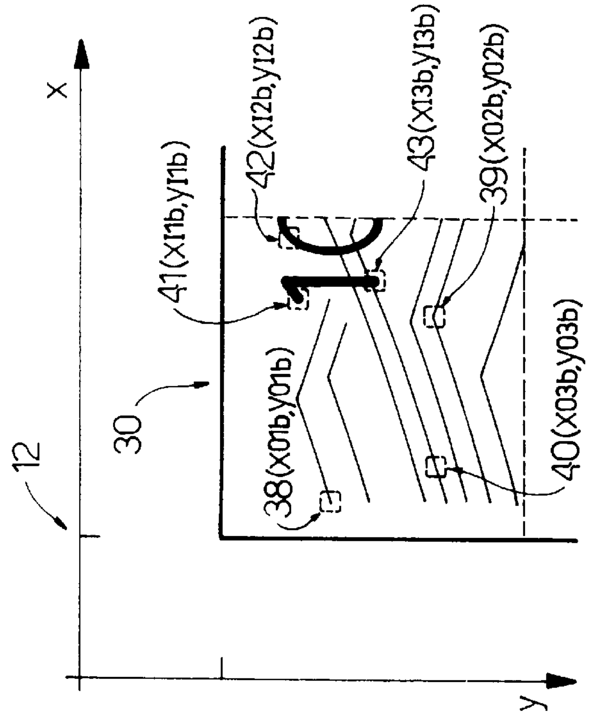
Figure 6:
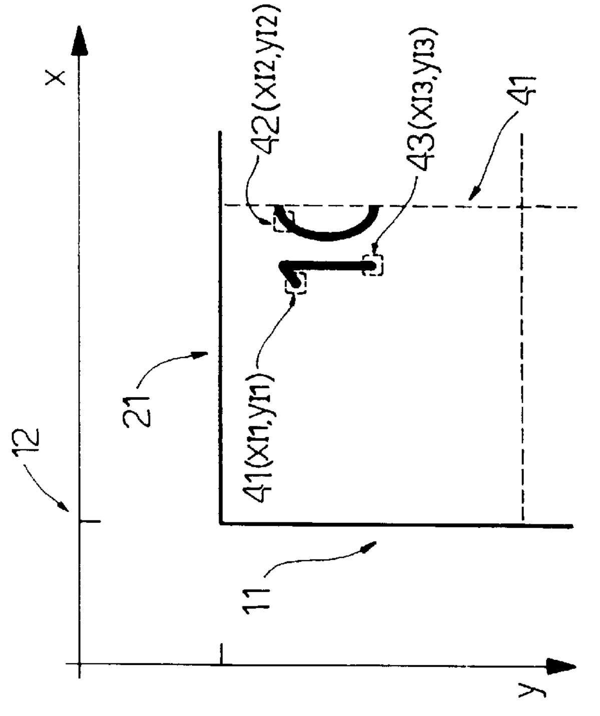

FIGS. 5, 6, 7 show enlargements of respective regions 13, 21, 30 of respective images 10, 11, 29. Three characteristic, distinguishable elements 38, 39, 40 of offset print O are selected in region 13, and the respective characteristic coordinates XO1, YO1, XO2, YO2, XO3, YO3 calculated with respect to reference system 12; and three characteristic, distinguishable elements 41, 42, 43 of intaglio print I are selected in region 21, and the respective characteristic coordinates XI1, YI1, XI2, YI2, XI3, YI3 calculated with respect to reference system 12. In actual fact, three characteristic elements of offset print O are selected for each region 13, 14, 15, 16, 17, 18, 19, 20 of image 10 and for each region 30, 31, 32, 33, 34, 35, 36, 37 of image 29; and three characteristic elements of intaglio print I are selected for each region 21, 22, 23, 24, 25, 26, 27, 28 of image 11 and for each region 30, 31, 32, 33, 34, 35, 36, 37 of image 29. For the sake of brevity, however, the following description will be limited to regions 13, 21, 30.

Figure 8:
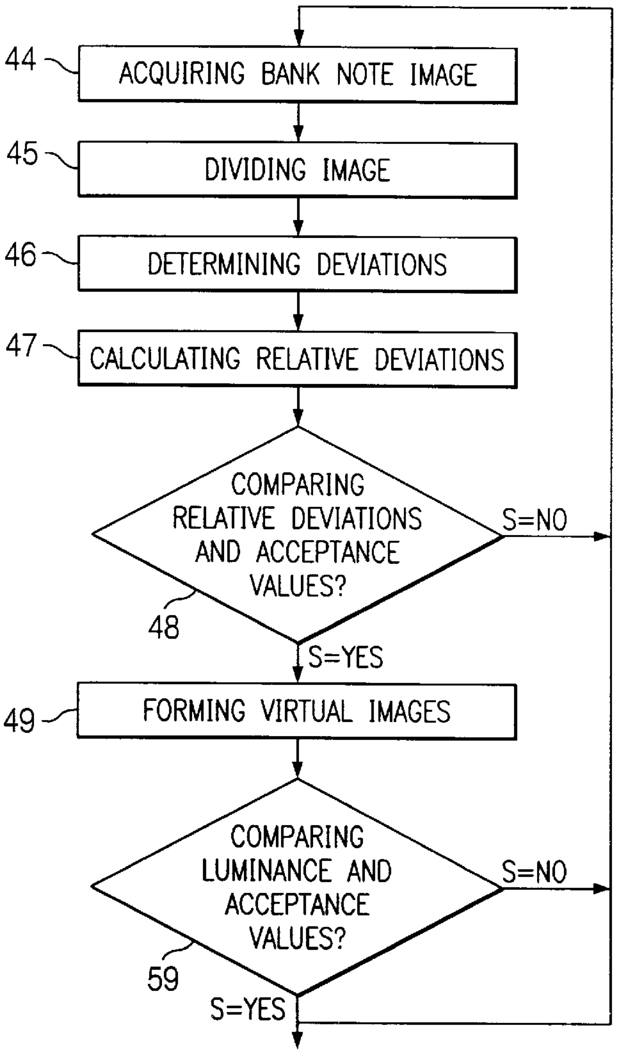
FIG. 8 shows a block diagram of the method according to the present invention.

The FIG. 8 block diagram shows, schematically, the steps in the control of banknote 2. In detail, control commences with a block 44, which represents the step of acquiring image 29 of a banknote 2. At this step, for each pixel P, camera 4 supplies image memory 5 with values Xp and Yp of the respective coordinates with respect to reference system 12, and the characteristic luminance value Vb of pixel P.

The next block 45 divides image 29 into the eight regions 30, 31, 32, 33, 34, 35, 36, 37 shown in FIG. 4. Which dividing step comprises determining eight groups of characteristic elements, each group comprising three characteristic elements of offset print O and three characteristic elements of intaglio print I; and acquiring the coordinate values of all the characteristic elements. More specifically, as shown in FIG. 7 relative to region 30, coordinate values XO1*b*, YO1*b*, XO2*b*, YO2*b*, XO3*b*, YO3*b* of characteristic elements 38, 39, 40 of offset print O, and coordinate values XI1*b*, YI1*b*, XI2*b*, YI2*b*, XI3*b*, YI3*b* of characteristic elements 41, 42, 43 of intaglio print I are acquired.

For each region, block 46 determines the deviations between all the characteristic elements of offset print O of image 29 and offset print O of image 10; and, similarly, determines the deviations of all the characteristic elements of intaglio print I of image 29 and intaglio print I of image 11. That is, as regards regions 13 and 30, the following operations are performed:

DXO1=XO1−XO1*b* (element 38)

DYO1=YO1−YO1*b* (element 38)

DXO2=XO2−XO2*b* (element 39)

DYO2=YO2−YO2*b* (element 39)

DXO3=XO3−XO3*b* (element 40)

DYO3=YO3−YO3*b* (element 40)

As a function of the coordinates listed above, the angular deviations of offset print O are also calculated in the form of angular coefficients:

DBO12=(XO2−XO1)/(YO2−YO1)−(XO2*b*−XO1*b*)/(YO2*b*−YO1*b*)

DBO13=(XO3−XO1)/(YO3−YO1)−(XO3*b*−XO1*b*)/(YO3*b*−YO1*b*)

DBO23=(XO3−XO2)/(YO3−YO2)−(XO3*b*−XO2*b*)/(YO3*b*−YO2*b*)

As regards intaglio print I, and with reference to regions 21 and 30, the following operations are performed:

DXI1=XI1−XI1*b* (element 41)

DYI1=YI1−YI1*b* (element 41)

DXI2=XI2−XI2*b* (element 42)

DYI2=YI2−YI2*b* (element 42)

DXI3=XI3−XI3*b* (element 43)

DYI3=YI3−YI3*b* (element 43)

DBI12=(XI2−XI1)/(YI2−YI1)−(XI2*b*−XI1*b*)/(YI2*b*−YI1*b*)

DBI13=(XI3−XI1)/(YI3−YI1)−(XI3*b*−XI1*b*)/(YI3*b*−YI1*b*)

DBI23=(XI3−XI2)/(YI3−YI2)−(XI3*b*−XI2*b*)/(YI3*b*−YI2*b*)

Block 47 calculates the relative deviations DXR, DYR and DBR between offset print O and intaglio print I of banknote 2 as a function of the above absolute deviations. In addition to relative deviations DXR, DYR and DBR, block 47 also calculates the deformation DDR of region 30 as a function of all the above absolute deviations and according to a known function not indicated in the present disclosure.

Block 48 compares relative deviations DXR, DYR and DBR with respective acceptance ranges LR and BR. That is, relative deviations DXR and DYR are compared with a limit range LR normally equal to one millimeter; and relative angular deviation DBR is compared with a limit range BR expressed in the form of an angular coefficient. If values DXR, DYR and DBR all fall within respective ranges LR and BR, a signal S=YES is emitted. Conversely, if at least one of values DXR and DYR is outside a respective range of limit ranges LR and BR, a signal S NO is emitted indicating rejection of the banknote 2 in question, by comprising at least one unacceptable characteristic, and the control cycle goes back to block 44 to control the next banknote 2. Signal S=YES, on the other hand, indicates the banknote 2 in question is acceptable as regards deviation and deformation, and the control cycle goes on to block 49 to analyze further parameters.

Figure 9:
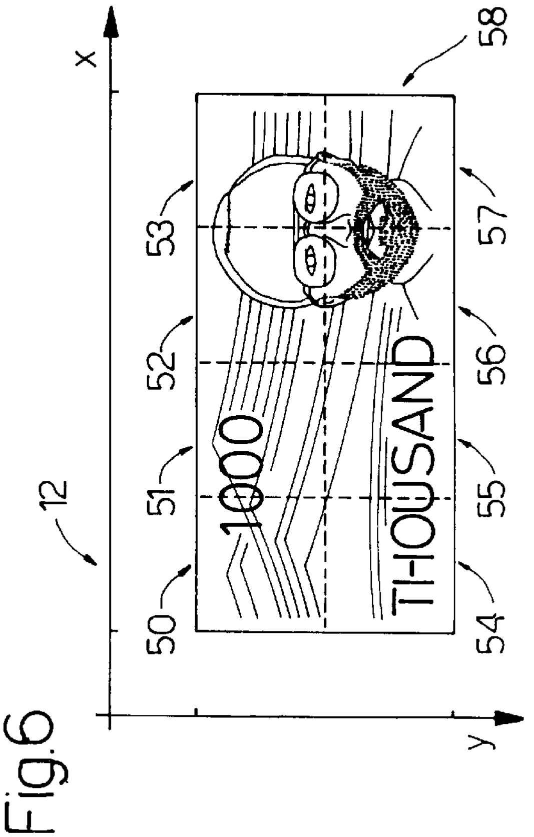
FIG. 9 shows an image used to implement the method according to the present invention.

Block 49 forms virtual images, that is, eight specimen regions 50, 51, 52, 53, 54, 55, 56, 57, which, when grouped in a predetermined order, correspond respectively with the eight regions 30, 31, 32, 33, 34, 35, 36, 37 of image 29 of banknote 2, and define the virtual image 58 of specimen banknote BC in FIG. 9.

Figure 10:
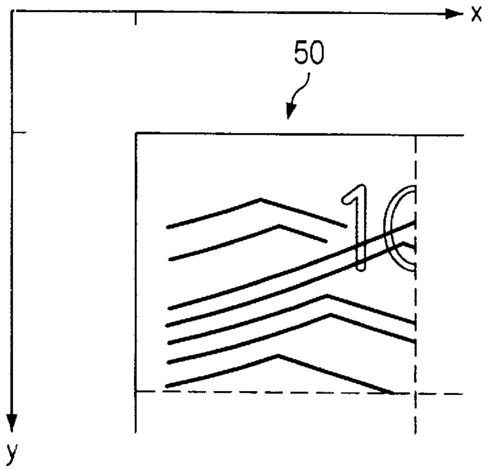
FIG. 10 shows a larger-scale view of a portion of the FIG. 9 image.

With reference to FIG. 10, region 50, which corresponds with region 30 of image 29, is formed as a function of the luminance values of pixels P of respective regions 13 and 20 of offset print O and intaglio print I, and as a function of relative deviations DXR, DYR and DBR and of relative deformation DDR, so that, for each pixel P, the deviations in offset print O and intaglio print I in region 50 equal those in the corresponding region 30 of image 29 of banknote 2. In block 49, the above operation is performed for each region 50, 51, 52, 53, 54, 55, 56, 57 as a function of respective regions 13, 14, 15, 16, 17, 18, 19, 20 of the offset print O image, as a function of respective regions 21, 22, 23, 24, 25, 26, 27, 28 of intaglio print I, and as a function of the respective relative deviations and deformations. That is, each pixel P in virtual region 50 is assigned a luminance value Vp as a function of luminance values VOp and VIp, which are added taking into account relative deviations DXR, DYR, DBR and deformation DDR.

In block 59, regions 30, 31, 32, 33, 34, 35, 36, 37 are compared with respective regions 50, 51, 52, 53, 54, 55, 56, 57 to determine whether, for corresponding pixels P, the difference between luminance values Vb and Vp falls within respective acceptance ranges R. If this condition is met for all the pixels P in all of regions 30, 31, 32, 33, 34, 35, 36, 37, banknote 2 is passed. Conversely, if at least one of the differences is outside the respective acceptance range R, banknote 2 is rejected.

This marks the end of the control cycle, which then goes back to block 44 to control the next banknote 2.

The method described provides for controlling deviation of offset print O and intaglio print I separately from the colouring or inking, to prevent deviation and deformation from affecting colour control and vice versa, and is particularly accurate by taking into account not only axial and angular deviations, but also deformation of sheet 3. Deformation control calls for dividing the image into regions to assume deformation within each region is linear and so calculate deformation over the whole region. If banknote 2 is relatively small, deformation may be assumed to be linear over the whole of banknote 2, so that dividing the image into regions is less significant, and the whole of banknote 2 may be considered one region.

What is claimed is:

1. A method of controlling banknotes comprising a first print (O) and a second print (I) effected at different stages; the method comprising the steps of:

memorizing a reference first image (10) of the first print (O) and a reference second image (11) of the second print (I);

acquiring a third image (29) of the banknote (2);

calculating absolute deviations (DXO1, DYO3, DXI1, DYI3, DBO12, DB1 23) of the first print (O) and of the second print (I) in the third image (29) with reference to the first and second images (10, 11);

calculating a relative deviation (DXR, DYR, DBR) between the first print (O) and the second print (I) of said banknote (2) as a function of said absolute deviations (DXO1, DYO3, DXI1, DYI3, DBO12, DBI23) of the first print (O) and of the second print (I) in the third image (29);

emitting an error signal in the event said relative deviation (DXR, DYR, DBR) fails to fall within a first acceptable range (LR, BR);

calculating a deformation (DDR) of the banknote (2) as a function of said absolute deviations (DXO1, DYO3, DXI1, DYI3, DBO12, DBI23) of the first print (O) and of the second print (I) in the third image (29);

obtaining modified reference first and second images (10, 11) by applying to said reference first and second images (10, 11) said relative deviation (DXR, DYR, DBR) and said deformation (DDR) of the banknote (2);

forming a fourth image (58) of the banknote (2) by combining said modified reference first and second images (10, 11);

comparing luminance values of said third image (29) with luminance values of the fourth image (58); and emitting an error signal in the event the luminance values of the third image (29) fail to fall within respective second acceptance ranges (R) of the luminance values of the fourth image (58).

2. A method as claimed in claim 1, wherein each first, second, third and fourth image (10, 11, 29, 58) is formed by at least one respective region (13, 21, 30, 50).

3. A method as claimed in claim 2, wherein said first, second, third and fourth images (10, 11, 29, 58) are formed by a number of corresponding respective regions (13, . . . ,20, 21, . . . ,28, 30, . . . ,37, 50, . . . ,57).

4. A method as claimed in claim 3, further comprising the step of determining a position, with respect to a reference system (12), of at least three characteristic elements (38, 39, 40) of the first print (O) in each region (13, . . . ,20,) of the first image (10); determining position, with respect to a reference system (12), of at least three characteristic elements (41, 42, 43) of the second print (I) in each region (21, . . . ,28) of the second image (11); determining a position of the three characteristic elements (38, 39, 40) of the third image (29); and calculating the absolute deviations (DXO1, DYO3, DXII, DYI3, DBO12, DBI23) of the first print (O) and of the second print (I) in the third image (29) with reference to the first and second images (10, 11).

5. A method as claimed in claim 4, wherein said first image (10) corresponds to a first series of values (Vop), the second image (11) corresponds to a second series of values (Vip), said third image (29) corresponds to a third series of values (Vb), and the fourth image (58) corresponds to a fourth series of values (Vp); the values (Vp) in the fourth series of values (Vp) are a function of the first and second series of values (VOp, Vip), of the relative deviation (DXR, DYR, DBR) and of deformation (DDR); and the values (Vb) in the third series being determined values.

6. A method as claimed in claim 1, wherein said first image (10) corresponds to a first series of values (VOp), the second image (11) corresponds to a second series of values (Vip), said third image (29) corresponds to a third series of values (Vb), and the fourth image (58) corresponds to a fourth series of values (Vp); the values (Vp) in the fourth series of values (Vp) are a function of the first and second series of values (VOp), VIp), of the relative deviation (DXR, DYR, DBR) AND OF DEFORMATION (DDR); and the values (Vb) in the third series being determined values.

* * * * *